United States Patent
Sison

(10) Patent No.: US 7,150,277 B1
(45) Date of Patent: Dec. 19, 2006

(54) PIVOTING GUIDE PULLEY STAND FOR WIRE SAW

(75) Inventor: Virgilio V. Sison, Canton, GA (US)

(73) Assignee: Georgia Stone Quarries Inc., Tate, GA (US), part interest ( * ) Notice: Subject to any disclaimer, the term of this patent is extended or adjusted under 35 U.S.C. 154(b) by 0 days.

(21) Appl. No.: 11/272,239

(22) Filed: Nov. 12, 2005

(51) Int. Cl.
*B28D 1/08* (2006.01)

(52) U.S. Cl. .................................. 125/21; 451/355

(58) Field of Classification Search ............... 125/21, 125/16.02, 12; 451/355; 83/651.1, 652, 83/661
See application file for complete search history.

(56) References Cited

U.S. PATENT DOCUMENTS

| | | | | |
|---|---|---|---|---|
| 4,765,307 A | * | 8/1988 | Kubo | 125/21 |
| 4,893,607 A | * | 1/1990 | Kubo | 125/21 |
| 5,060,628 A | * | 10/1991 | Ishida | 125/21 |
| 5,699,783 A | * | 12/1997 | Kubo | 125/21 |
| 6,510,774 B1 | * | 1/2003 | Steiner | 83/200.1 |
| 6,513,513 B1 | * | 2/2003 | Steiner | 125/16.02 |

\* cited by examiner

*Primary Examiner*—Robert A. Rose

(57) ABSTRACT

A guide pulley stand for wire saw use in stone quarries, for guiding the cutting wire when the wire saw unit is set up on the top of the object to be cut. The pivoting guide pulley stand comprises of a support base on the front end of the wire saw track, a guide pulley stand rotatably supported on the support base, and an adjustable stabilizing member rotatably connected to a swivel on the pulley stand to support the pulley stand upright and rigid on either the left side or the right side of the wire saw track.

1 Claim, 6 Drawing Sheets

PIVOTING GUIDE PULLEY STAND FOR WIRE SAW

REFERENCES

Current U.S Class 125/21; 125/12

STATEMENT REGARDING FEDERALLY SPONSORED RESEARCH OR DEVELOPMENT

Not Applicable

REFERENCE TO SEQUENCE LISTING

Not applicable

BACKGROUND OF THE INVENTION

1. Field of Invention

The present invention relates generally to a guide pulley stand for diamond wire saw cutting in stone quarries. More specifically, to a guide pulley stand for wire saw used for guiding the cutting wire when the wire saw unit is set up on the top of the object to be cut.

2. Background Information

Diamond wire cutting technology is now widely used in the stone quarrying industry. The technology utilizes a loop of diamond wire driven by a diamond wire saw unit to perform the main big cuts in the stone quarry, cutting stone surfaces of up to some 100–150 square meters or more, following any cutting direction from vertical to horizontal. Wire saw units manufactured at present comes standard with 360 degrees flywheel rotation and flywheel lateral movement allowing these machines the possibility to make multiple cuts in one set up.

Pulleys and/or pulley assemblies are normally employed to assist in making the cut as smooth and straight as possible. The "bicicletta" (bicycle; literally, a pulley stand with two pulleys) is one such assembly used to make wire saw cuts from the top surface to be cut.

The typical "bicicletta" is an 8–10 feet long piece of metal pipe structure, 2½–3 inch in diameter, with a short peg at the bottom of its base. The base generally has provisions for anchoring said base onto the quarry floor to prevent it from moving. Eyes for hooks and/or chains are provided on the top end of the pulley stand, so that the tall structure may be held upright and rigid, by chains and turnbuckles and anchor plugs driven into the quarry floor. This set up procedure requires drilling several holes on the quarry floor.

While the "bicicletta" has proven very effective through the years, several problems may nevertheless be enumerated on its use. The complicated installation and disassembling work; the many man-hours required for manipulating, adjusting, and lining up all the pulleys; and the eventual loss in pay volume due to the holes drilled on the quarry floor, are but a few.

A need therefore exists for an improved guide pulley stand, the use of which would improve the overall productivity of the stone quarries by eliminating pay volume losses due to holes drilled on the quarry floor, as well as eliminate man-hours spent on the rigors of employing the use of the prior art. Further, it is desirable that the improved guide pulley stand be easy to set up, be made ready for actual use when needed in the least amount of time possible, and capable of effecting multiple cuts in one wire saw set up.

It is to such improved guide pulley stand that this invention is directed.

BRIEF SUMMARY OF THE INVENTION

The present invention has an object the provision of an improved guide pulley stand that is simple and easy to set up, and capable of effecting multiple cuts in one wire saw set up;

The present invention has, as a further object, the provision to eliminate the need to drill holes on the quarry floor to set up a guide pulley stand, which holes translate into losses in pay volume to the quarry operator;

The present invention has, as a further object, the provision to eliminate the need to devote production idle man-hours spent on the rigors of employing the use of a typical guide pulley stand;

To achieve the foregoing and other objects in accordance with the purpose of the present invention, the guide pulley stand is mounted directly onto the front end of the wire saw track, such that the improved guide pulley stand is available for use whenever the wire saw tracks are set up in preparing for a wire saw cut. The invention is a pivoting guide pulley stand for wire saw capable of multiple cuts in one wire saw set up.

A support base is welded (or bolted) directly onto the front end of the wire saw track. The medial portion of this support base is a center bolt where an L-shaped guide pulley stand frame is mounted upright and secured loosely making it possible to pivot the guide pulley stand frame either to the left side or the right side of the wire saw track. A pin locks the L-shaped frame secured on the support base on either the left side or the right side of the wire saw track, through holes made for this purpose. The top of the pulley tree has a swivel, where the top end of a stabilizer rod is connected, to provide movement when the guide pulley stand frame is pivoted left or right of the wire saw track. The bottom end of the stabilizer rod is secured by a pin on one of the rear base brackets. To hold the pulley tree assembly stable and rigid, a turnbuckle on the medial portion of the stabilizer rod is adjusted to take out any slack out of the set up.

DETAILED DESCRIPTION OF THE INVENTION

Figure 1:
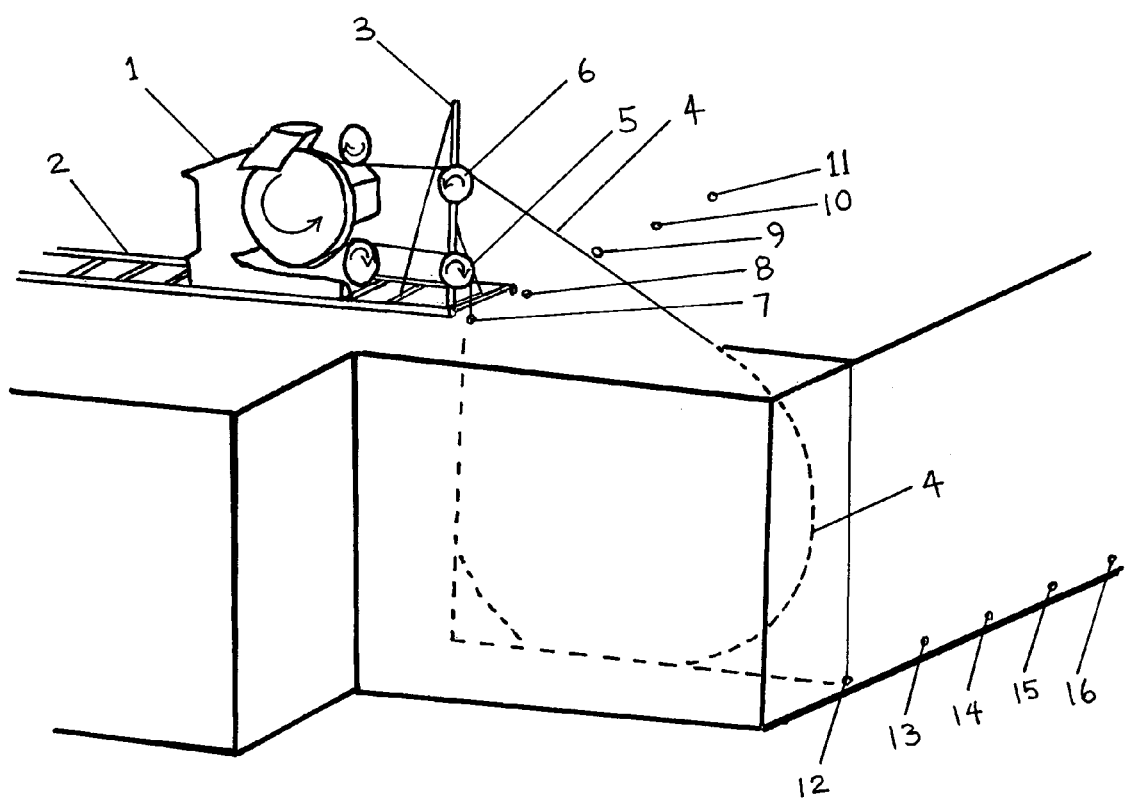
FIG. 1 is a perspective view of a wire saw machine making a cut from the top of a quarry bench, using a guide pulley stand mounted on the front end of the track.
Figure 2:
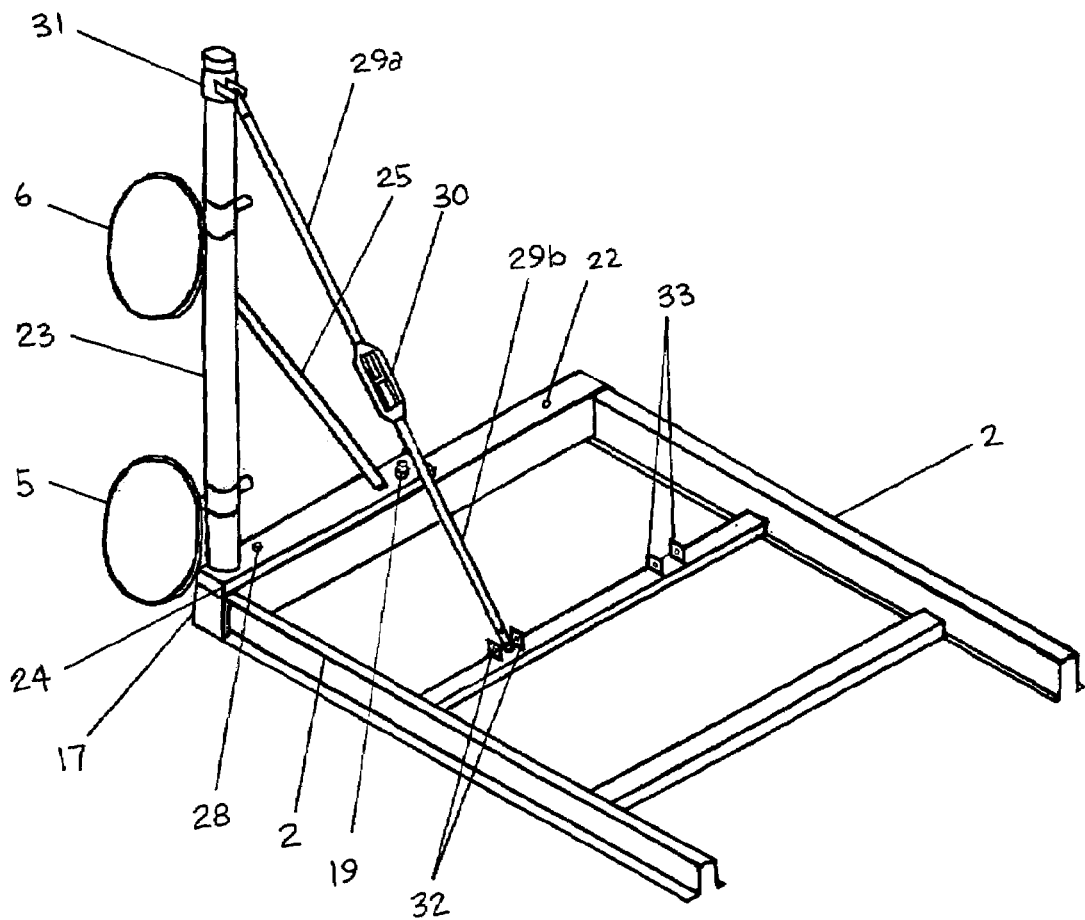
FIG. 2 is a perspective view of the pivoting guide pulley stand shown mounted on a wire saw track.
Figure 3:
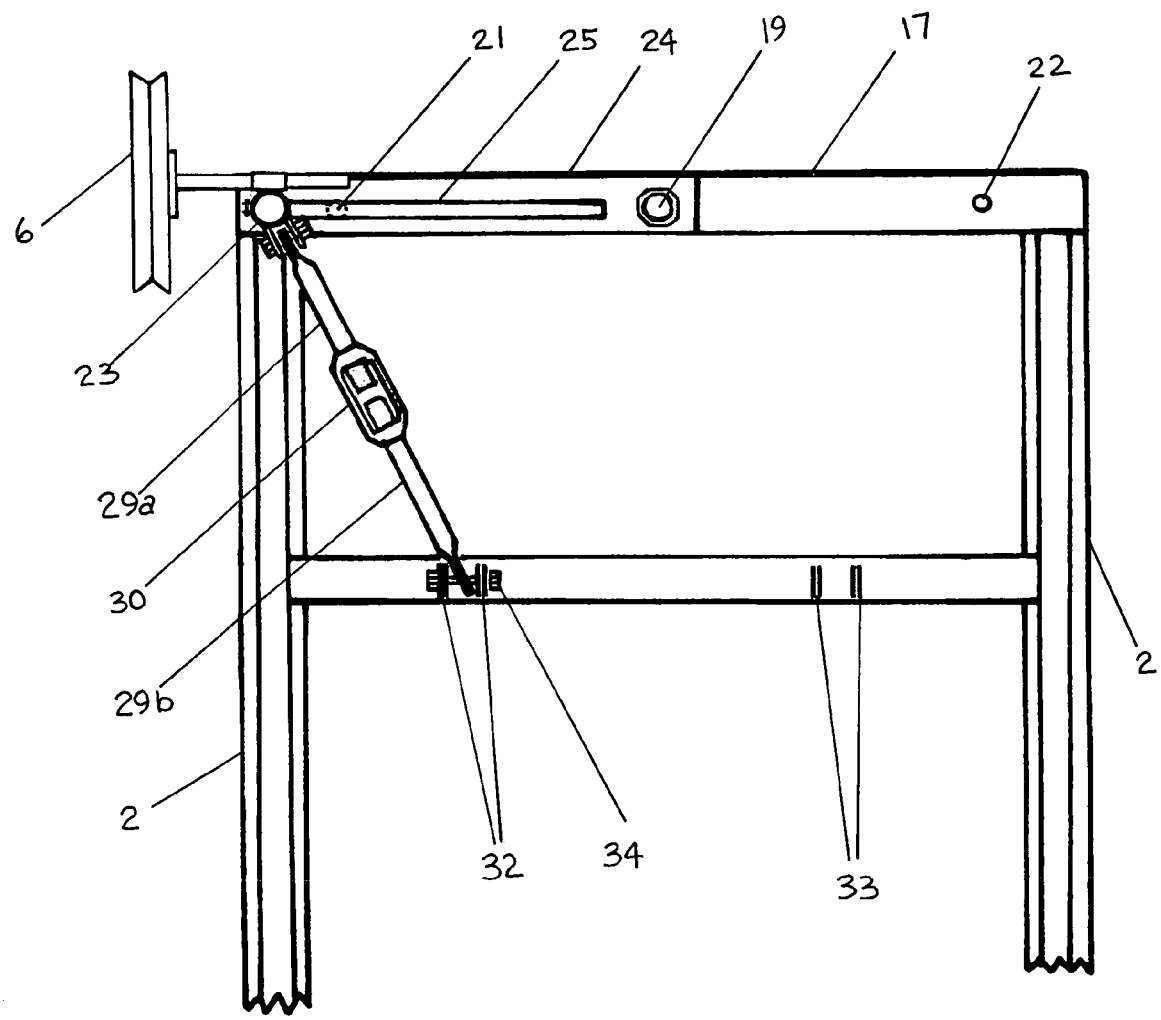
FIG. 3 is a top view of the proposed embodiment shown with the pulley stand mounted on the left side of the wire saw track.
Figure 4:
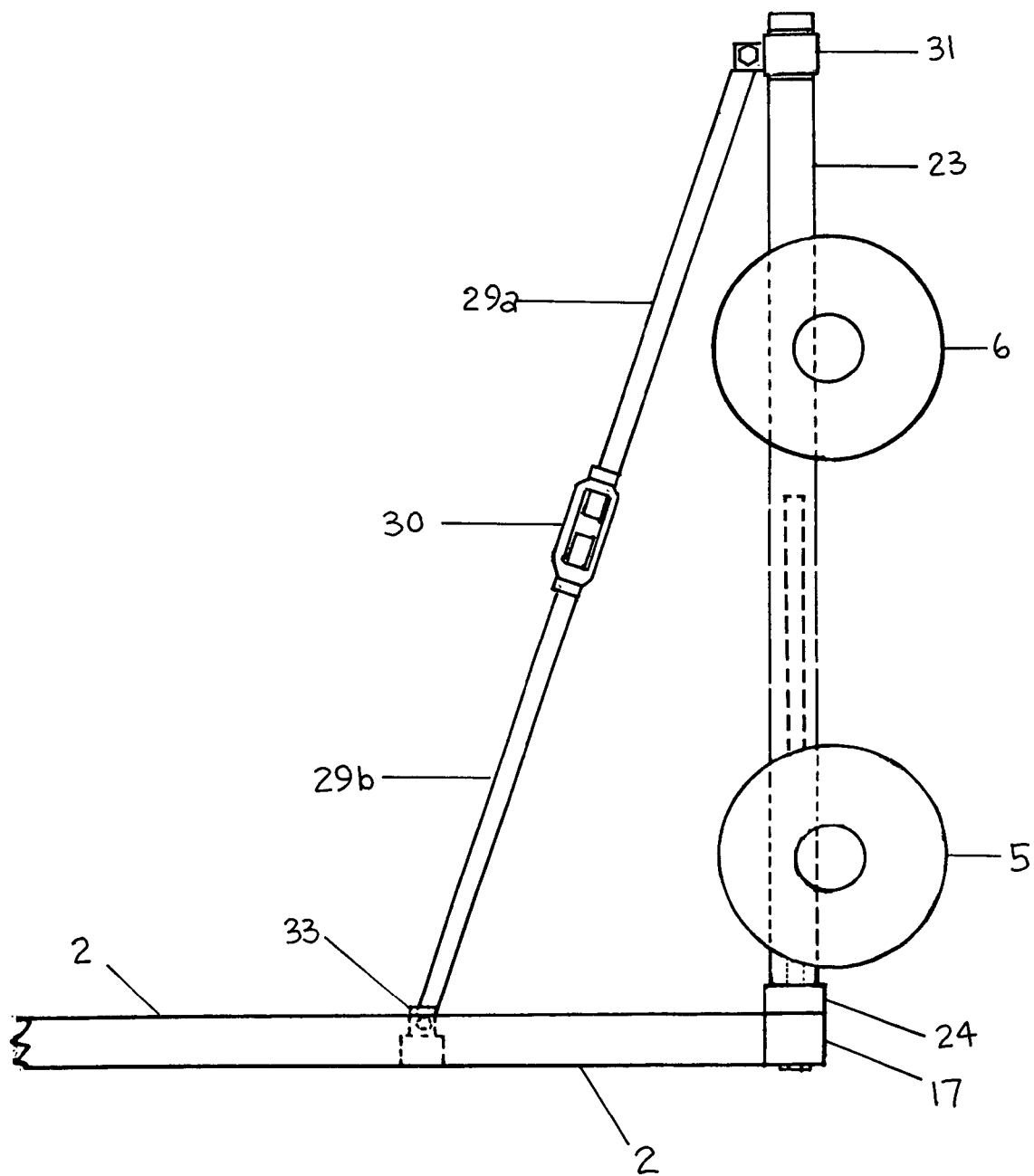
FIG. 4 is a side view of the proposed embodiment shown with the pulley stand mounted on the right side of the wire saw track.
Figure 5:
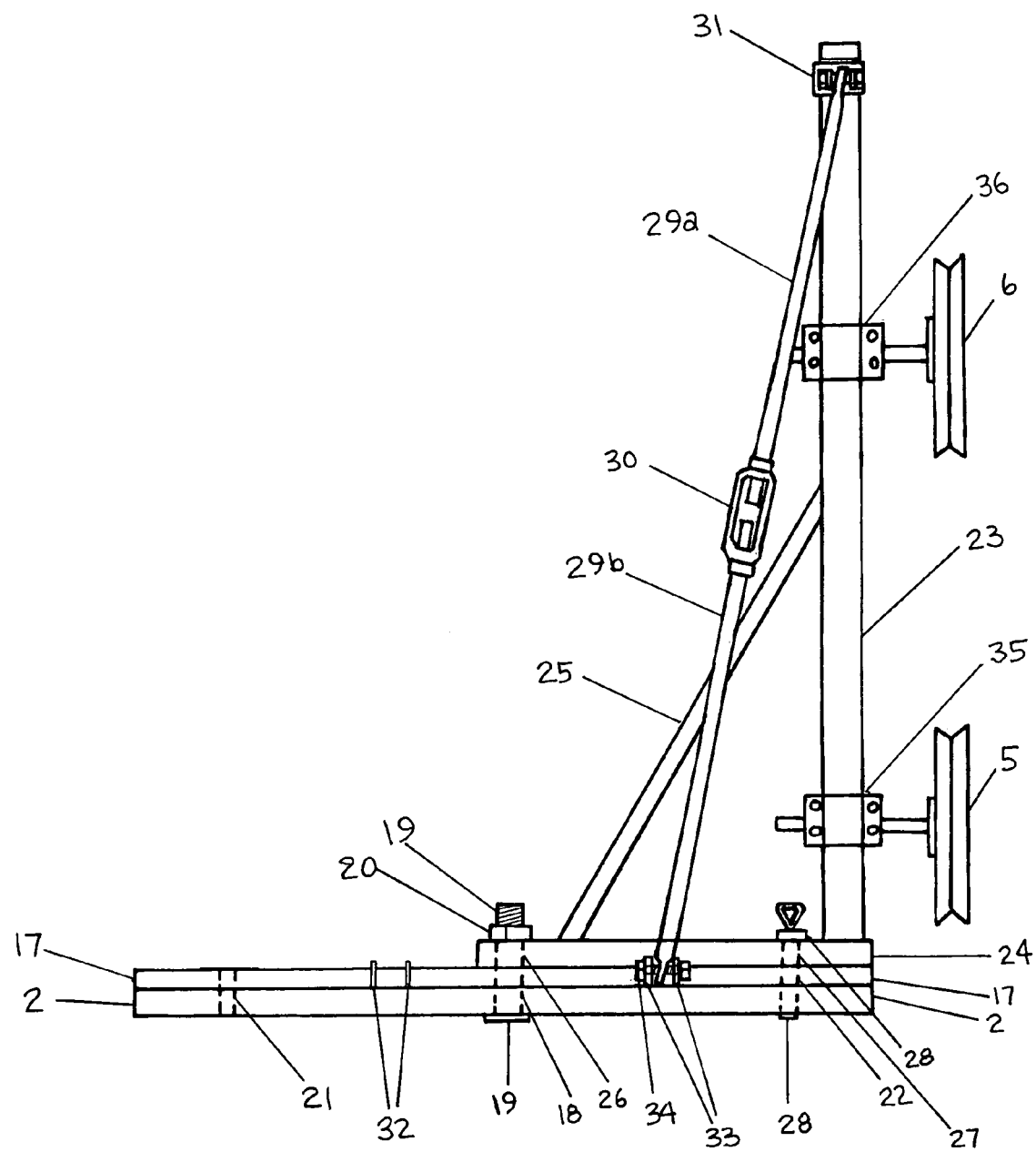
FIG. 5 is a rear view of the proposed embodiment with the pulley stand mounted on the right side of the wire saw track.
Figure 6:
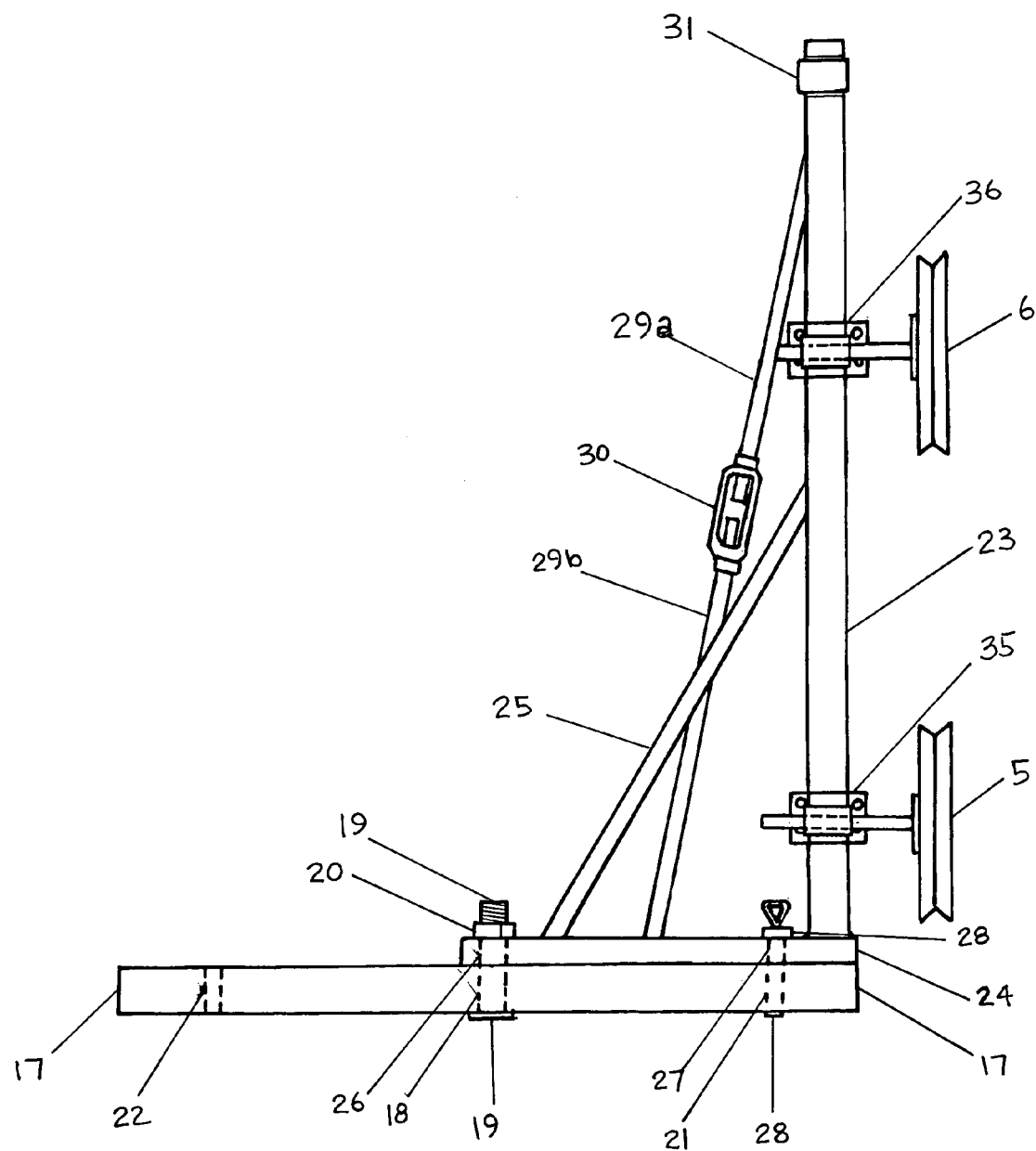
FIG. 6 is a front view of the proposed embodiment with the pulley stand mounted on the left side of the wire saw track.

FIG. 1 depicts how the guide pulley stand is employed in the quarry in making a cut from the top of a quarry bench. In this figure, it is shown that the diamond wiresaw machine 1 mounted on its track 2 is making a cut with a loop of diamond wire 4. Cutting from the top of the bench require the use a guide pulley stand 3 to guide the diamond wire 4 in making the cut.

Vertical holes 7, 8, 9, 10, & 11 are pre-drilled holes that intersects a horizontal counterpart herein shown as Horizontal holes 12, 13, 14, 15, & 16 respectively, and are used for diamond wire passage.

In cutting mode, diamond wire 4 feeds down into the cut through vertical hole 7 with the use of the bottom pulley 5 of the guide pulley stand 3, set directly above the vertical hole 7. The wire 4 loops back out through horizontal hole 12 as the wiresaw machine 1 pulls the wire 4 back up, guided by the top pulley 6 of the guide pulley stand 3 straight back to the wiresaw.

It may be gleaned from FIG. 1, that the front end of the track 2 of the wiresaw machine 1 is set up between vertical hole 7 and vertical hole 8, thus making it possible to make two cuts in one set up. Normal alignment of the wiresaw tracks with the line of cut and leveling the same with wedges are prerequisites in order to assure a straight, clean, and smooth cut.

Referring now to FIGS. 2–6, shown therein is a pivoting guide pulley stand assembly constructed in accordance with the following invention.

The support base 17 of the pivoting guide pulley stand is welded onto a wiresaw track 2 with care taken that it squares up and level perfectly with the wiresaw track 2. Three holes are precision drilled top to bottom of the support base 17. A 1½" diameter support base center hole 18 located at the median center of the base, and two support base position holes 21 & 22 each 1" in diameter.

A bolt 8"×1½" diameter, modified to flatten its head by at most a quarter of an inch (¼") thick, is inserted from under the support base center hole 18 to serve as the center bolt 19 of the pivoting guide pulley stand assembly.

The L-shaped guide pulley stand frame consists of a pole 23, a frame base 24, and frame brace 25 all welded as a single piece. The bottom end of the pole 23 is welded perpendicularly upright to the frame base 24, and the frame brace 25 provide the support to make sure it stays perpendicular in place. Guide pulleys 5 & 6 are rotatably attached to pole 23 using pulley mounts 35 and 36.

The frame base 24 has two strategically located holes both drilled top to bottom of frame base 24. A 1½" diameter pivot hole 26 used to mount the guide pulley stand frame onto the support base 17, and a 1" diameter mounting-pin hole used to secure the guide pulley stand frame in place either on base position hole 21 or base position hole 22, with the use of a 1" diameter×6¼ mounting pin 28. It is advantageous that said mounting pin 28 be provided with a handle or such provision to make it easy to pull in and out of the holes.

Desirable results have been obtained using square metal tubes in the fabrication of the support base 17, and frame base 24. 4"×4"×¼" used to fabricate the support base 17, while 2"×4"×¼" was used on the frame base 24.

Pivot hole 26 of the guide pulley stand frame is mounted into the center bolt 19 of the support base 17, and nut 20 is screwed into place loosely (or hand tight) thus allowing the guide pulley stand frame to pivot on either side of the wiresaw track 2 if needed.

To counter the pull stresses at the top of the guide pulley stand when the wire is in cutting mode, an adjustable stabilizer rod (29 *a* and 29*b*) was introduced to provide rigidity to the whole assembly and do away with all the chains and rock anchors typically needed to set up a pulley stand. The use of a single rod to support the pivoting guide pulley stand assembly is now possible owing to the design and construction of the guide pulley stand frame. The L-shaped design guarantees the verticality of the pole 23 and the horizontality of the frame base 24, that the whole assembly technically would level into place as the wire saw tracks 2 are leveled in preparing for a wire saw cut. Further, the 4" wide metal bases 17 & 23 seated flush atop each other, bolted and pinned into position, provide the pulley stand with considerable rigidity along the length of the base.

The top end of the stabilizer rod 29*a* is connected to the swivel 31 at the top of the guide pulley stand, while the bottom end is connected to a corresponding rear base bracket 32 or 33 adapted (by way of welding or bolting a bracket into place) onto the wiresaw track for this purpose. On the medial portion of the stabilizer rod 29 is a stabilizer rod adjuster 30, herewith shown as a turnbuckle, which serves to take any slack out of the whole setup, for a rigid and stable guide pulley stand.

The swivel 31 on the top of the guide pulley stand connected to the stabilizer rod 29 provides the latter the flexibility of movement it needs when the guide pulley stand frame is pivoted to set up for the next cut, making it so easy to mount the pulley stand left or right of the wire saw track.

With nothing more than loosening up the stabilizer rod adjuster 30, pulling out the rear base pin 34, pulling out mounting pin 28, pivoting the guide pulley stand frame, and placing back the pins in their respective new positions, the pivoting guide pulley stand can be mounted, ready for actual use, in minutes, without the usual need to drill holes to set up a pulley stand.

While the detailed description above has been expressed in terms of specific examples, those skilled in the art will appreciate that many other configurations could be used to accomplish the purpose of the said invention. Accordingly, it will be appreciated that various modifications of the above described embodiments may be made without departing from the essence and scope of the invention. Therefore, the invention is to be limited only by the following claim.

What is claimed is:

1. A guide pulley stand for wiresaw, comprising:
   a support base mounted directly onto a wiresaw track;
   a pulley stand frame for two pulleys, pivotally connected on the said base in such a way to allow the pulley stand frame to be swiveled alternatively to either the left or right side of the wiresaw track;
   a pair of guide pulleys movably connected to the pulley stand; and
   an adjustable stabilizing rod rotatably connected to the pulley stand.

* * * * *